FIG. 4

March 7, 1939.  F. A. HUBBARD  2,149,343
SIGNALING SYSTEM
Filed March 14, 1936  7 Sheets-Sheet 5

FIG. 5

INVENTOR
F. A. HUBBARD
BY P. C. Smith
ATTORNEY

March 7, 1939.  F. A. HUBBARD  2,149,343
SIGNALING SYSTEM
Filed March 14, 1936  7 Sheets-Sheet 6

INVENTOR
F. A. HUBBARD
BY
P. C. Smith
ATTORNEY

March 7, 1939.  F. A. HUBBARD  2,149,343
SIGNALING SYSTEM
Filed March 14, 1936  7 Sheets-Sheet 7

INVENTOR
F. A. HUBBARD
BY
P. C. Smith
ATTORNEY

Patented Mar. 7, 1939

2,149,343

UNITED STATES PATENT OFFICE 2,149,343

SIGNALING SYSTEM

Francis A. Hubbard, Maplewood, N. J., assignor to Bell Telephone Laboratories, Incorporated, New York, N. Y., a corporation of New York Application March 14, 1936, Serial No. 68,867

10 Claims. (Cl. 177—353)

This invention relates to an indicating mechanism particularly adaptable for indicating to the operator of a manual telephone office, the numbers of wanted lines terminating in the office and dialed by subscribers in dial offices having access to the manual office. The invention is not, however, limited to such use but in its broader aspects may be employed as an annunciator in a signaling system such as a carriage call system.

The object of the invention is to enable multiple-digit designations to be efficiently, rapidly and accurately displayed by a simple mechanism which performs the dual function of registering series of incoming impulses and displaying designations corresponding to the digital values of such impulse series.

In accordance with one embodiment of the invention, this object is accomplished by utilizing a cross-bar switch of a type disclosed in Patent No. 2,021,329 granted November 19, 1935 to J. N. Reynolds. As adapted to the present invention the cross-bar switch is provided with ten select magnets corresponding to the ten digits 0 to 9, inclusive, controlling the rotation of five horizontal or selecting bars in either a clockwise or a counter-clockwise direction. Each bar carries five spring fingers. Five hold magnets are also provided corresponding to the thousands, hundreds, tens and units numerical digits and the party line letters of subscribers' directory numbers. Each hold magnet controls the movement of a vertical or holding bar, the holding bars being positioned at right angles to the horizontal bars.

Associated in proximity to each intersection of a vertical and a horizontal bar is a rocker arm connected with a target on which are placed numerals or station identifying letters. The targets are arranged in five units allocated to the five vertical holding bars, the targets of the first four units bearing the numerals 1 to 0, inclusive, and the targets of the fifth unit bearing the station letters J, M, R and W. A vertical bar is incapable of operating any rocker arm unless one of the spring fingers has been previously interposed by the operation of the corresponding select magnet.

When a called number is to be registered the series of impulses representing the thousands digit is caused to operate the appropriate select magnet thus bringing the spring fingers carried by the associated horizontal bar into operating position between the holding bars and the rocker arms of the horizontal row of rocker arms corresponding to the operated horizontal bar. The first or thousands hold magnet is then operated and the vertical holding bar operated thereby then moves only the rocker arm beside which a selecting finger of the operated selecting bar was positioned. The movement of the rocker arm then brings into view in the thousands unit of targets the numeral corresponding to the digital value of the thousands series of impulses.

The thousands hold magnet remains operated and the select magnet is then released leaving the spring finger held between the holding bar and the operated rocker arm. The incoming series of impulses corresponding to the hundreds digit then causes the operation of the appropriate select magnet and the operation of the hundreds hold magnet thus operating a rocker arm in the hundreds vertical row bringing into view a numeral in the second unit of targets corresponding to the digital value of the hundreds digit. In a similar manner rocker arms are operated to display numerals corresponding to the tens and units series of impulses and a station letter corresponding to the station's series of impulses. Thus in response to the impulse series the number of a wanted subscriber's line is displayed before the operator and she may terminate the connection in the usual manner by connecting with the jack of the subscriber's line the number of which has been so displayed.

In accordance with a further embodiment of the invention, drums bearing numerals and station letters may be provided. When the rocker arms corresponding to the numerical digits and station letter of a desired line number have been operated in the manner previously described, the drums are rotated to different degrees to expose the numerals and station letter corresponding to the digits and station letter of the desired line designation.

For a more complete understanding of the invention reference is made to the following detailed description taken in connection with the accompanying drawings in which:

Fig. 2 illustrates a manual office in which trunks incoming from the distant automatic office terminate in cord circuits at an operator's position. The cord circuit in which the trunk leading from the automatic office terminates is shown in detail while a second of the cord circuits of the operator's position is illustrated schematically. Fig. 2, furthermore, discloses a register selector switch individual to the incoming trunk and serving to associate the same with indicator registering mechanisms;

Figs. 11 to 15, inclusive, show a further modification of the number indicator; Fig. 12 showing a sectionalized elevational view of the indicator taken along section line 12—12 of Fig. 13; Fig. 13 showing a cross-sectional view of the indicator taken along section line 13—13 of Fig. 12; Fig. 14 showing details of indicator targets and Fig. 15 showing a detail of the normalling spring of one of the target operating levers.

Figures 1, 16:
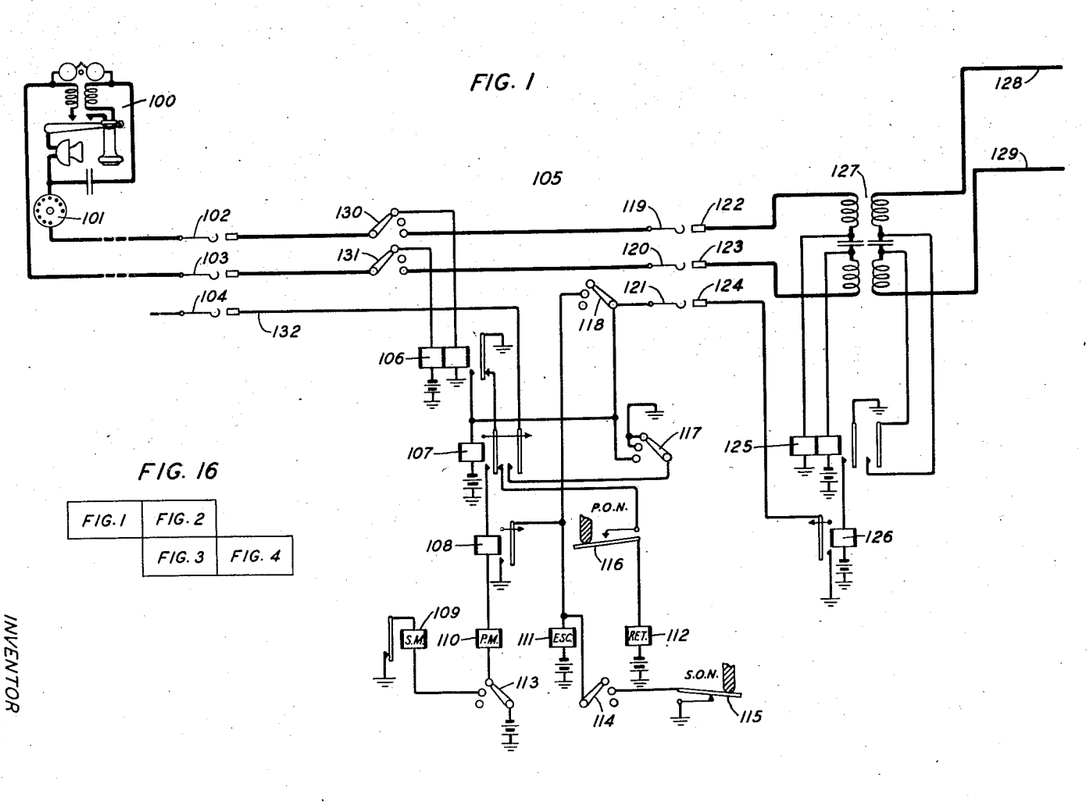
Fig. 1 shows a single subscriber's line terminating in a central office equipped with automatic switches and also the outgoing end of an interoffice trunk accessible to said switches.
Fig. 16 is a chart showing the manner in which Figs. 1 to 4, inclusive, should be arranged to disclose the operating circuits.
Figure 2:
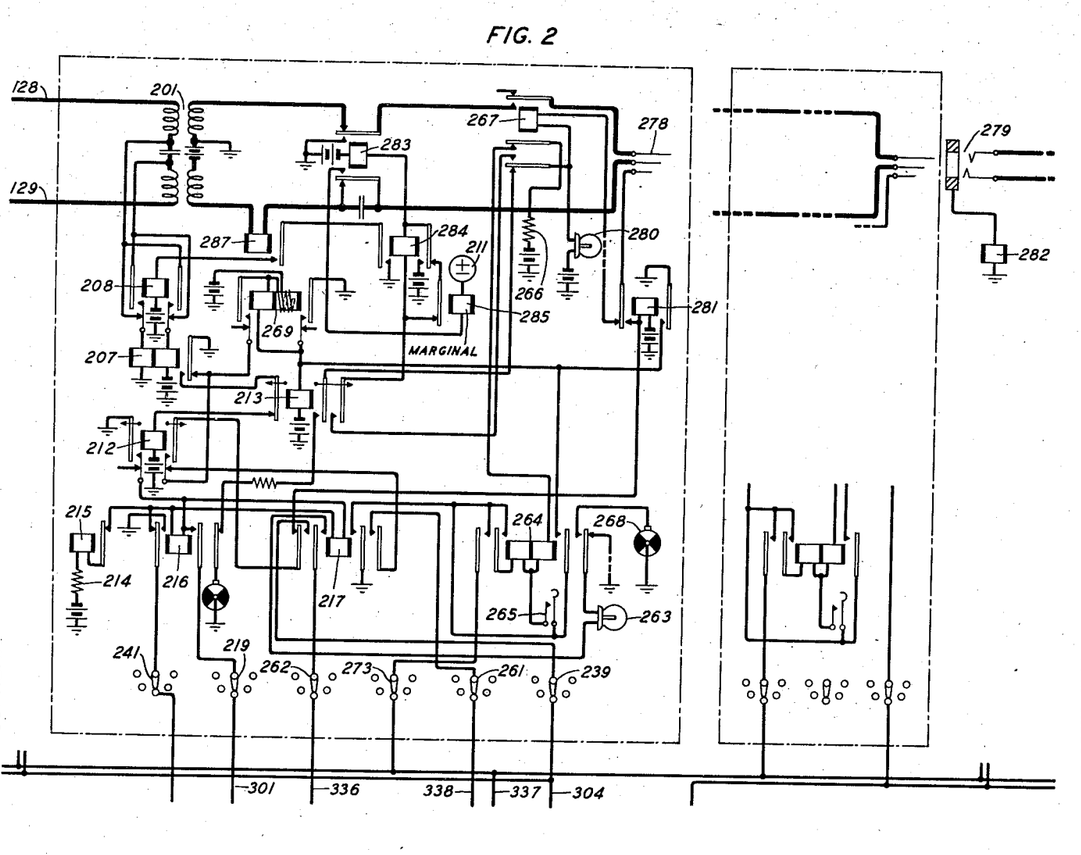

The central office and manual office circuits disclosed in Figs. 1 and 2 are of the step-by-step type such as are disclosed, for example, in Patent No. 1,623,118 granted April 5, 1927 to E. Jacobsen. It is to be understood, however, that these circuits are disclosed herein only to illustrate the manner in which the invention may be employed with well-known circuits for indicating to a manual operator the number of a desired line which terminates at her position.

Figure 4:
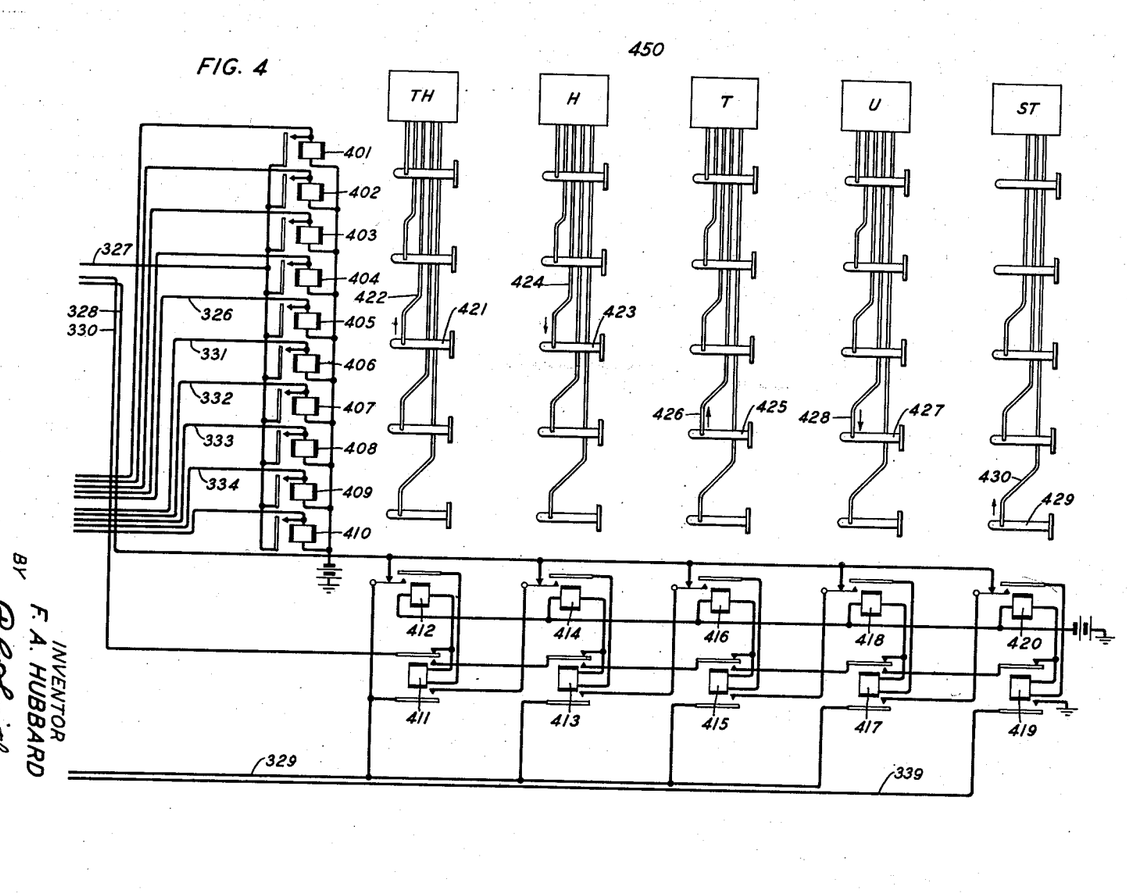
Figure 5:
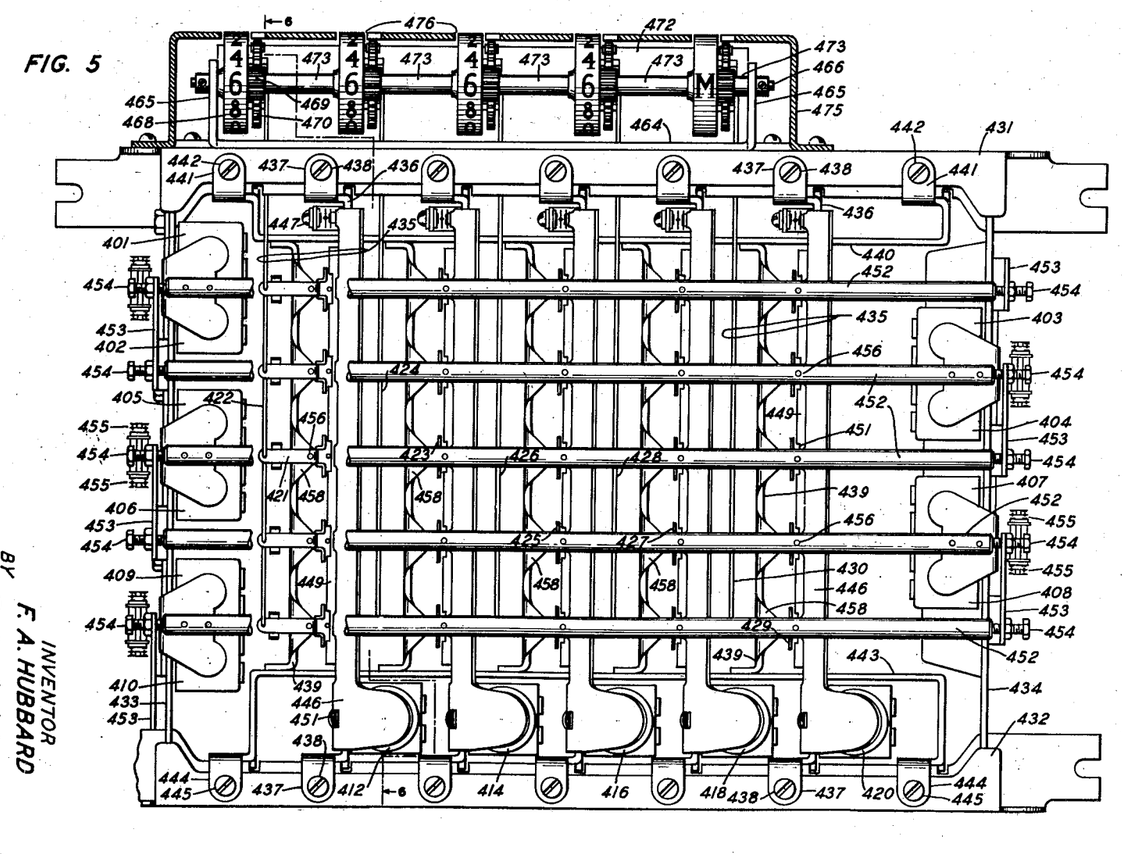
Fig. 5 shows in detail a front elevation of the cross-bar register and one modification of a number indicator.
Figures 6, 7, 8, 9, 10:
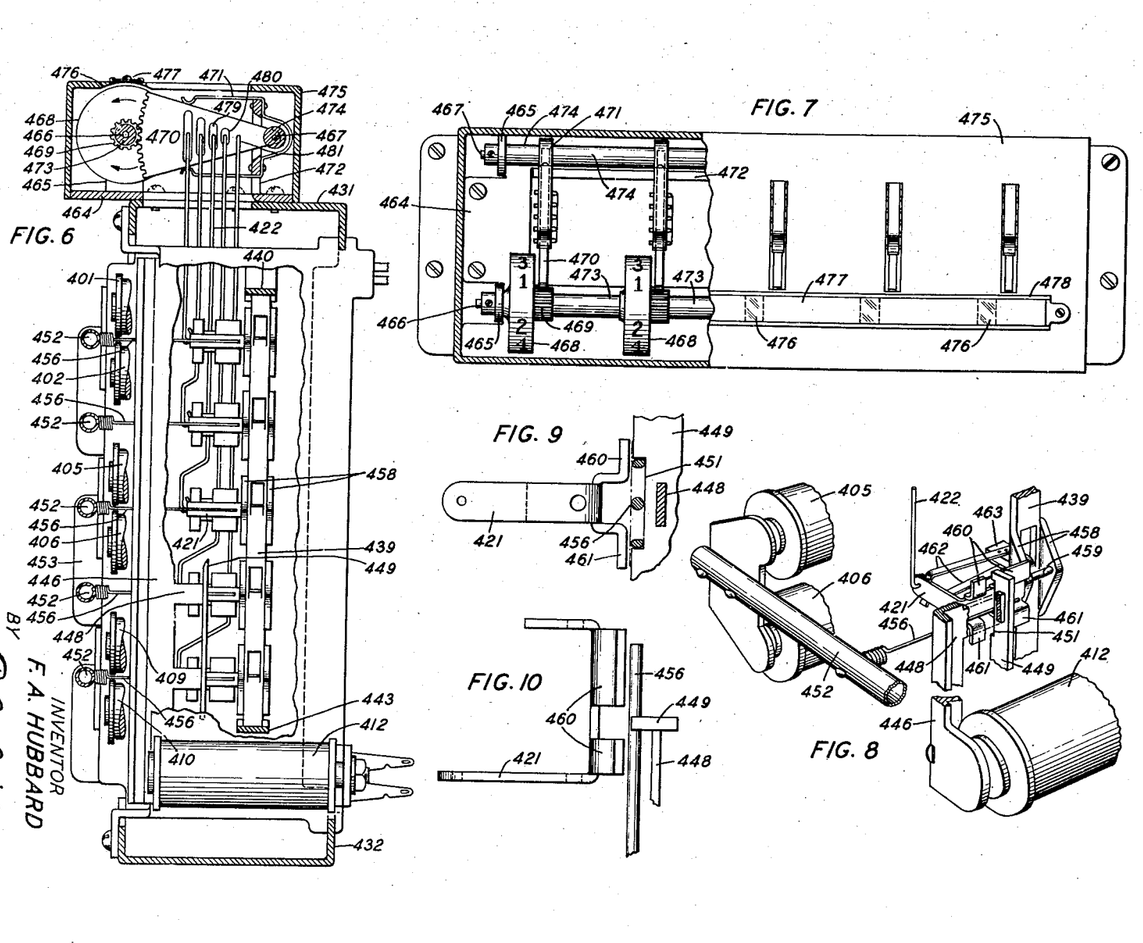
Fig. 6 shows a cross-section of the cross-bar register and number indicator taken on the section line 6—6 of Fig. 5.
Fig. 7 shows a top plan view of the indicator of Fig. 5 with a portion of the cover plate broken away to show the indicator units.
Fig. 8 is a detail showing one rocker arm and the mechanism by which it is operated through the conjoint operation of a vertical bar and a horizontal bar of the cross-bar register.
Figs. 9 and 10 show respectively, elevational and plan views on an enlarged scale of a rocker arm such as is disclosed in Fig. 8.

As hereinbefore stated, the cross-bar register disclosed schematically in Fig. 4 and in more detail in Figs. 5 and 6, may be of the type disclosed in the patent to J. N. Reynolds hereinbefore referred to, but modified for the purposes of the present invention.

Figure 3:
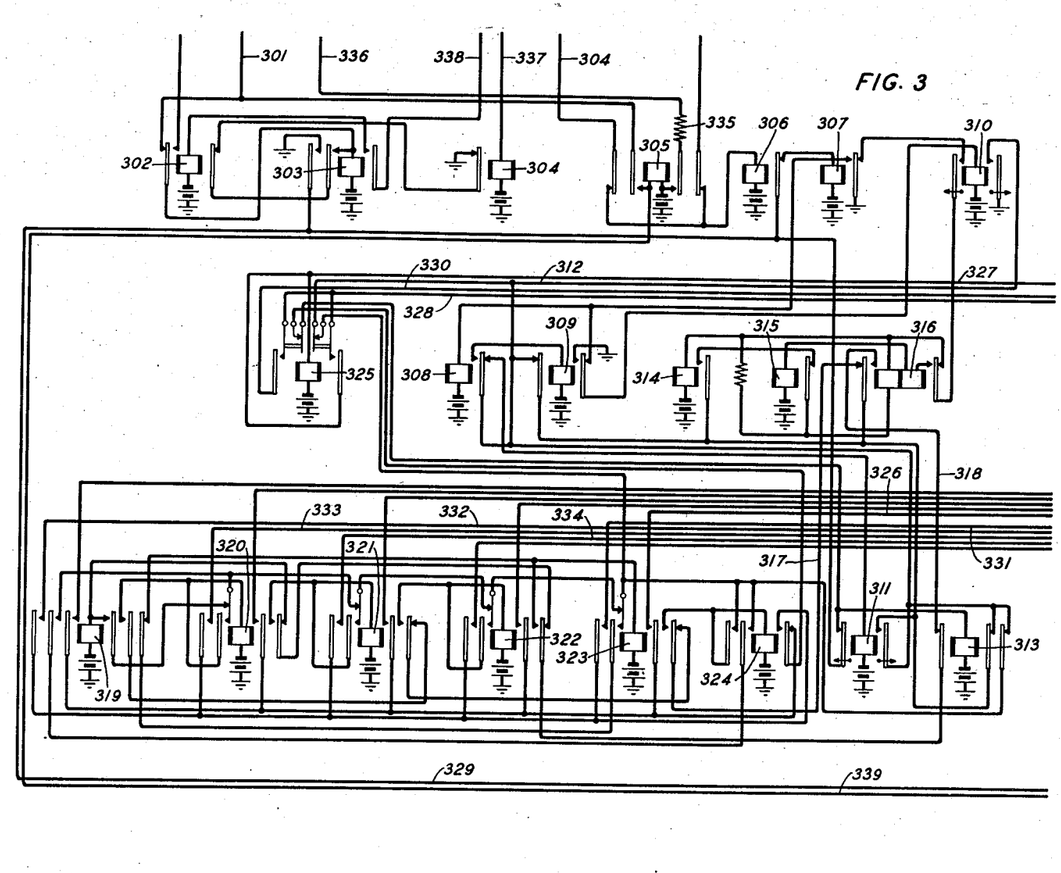
Figs. 3 and 4 taken together show one complete indicator register mechanism at the operator's position concerned, Fig. 3 showing the control relays and Fig. 4 showing schematically the cross-bar register and the indicator operated thereby.

It will be assumed that the subscriber of line 100, which line terminates in the automatic office equipped with switches of the step-by-step type, wishes to communicate with a subscriber whose line terminates in a distant manual office provided with operators' equipment such as is shown in Figs. 2, 3 and 4. For obtaining this connection the subscriber first removes his receiver thereby causing the operation of a preliminary switch which may be a line-finder, or as disclosed, a line switch to set its brushes 102, 103 and 104 upon the terminals of an idle trunk leading to a first selector switch 105. As soon as the trunk is chosen, a circuit is closed for the line relay 106 including the loop of the subscriber's station. Relay 106 at its front contact closes a circuit for slow-to-release relay 107. The subscriber next manipulates his dial 101 in accordance with the first digit of the desired line number. For each opening of the line, relay 106 retracts its armature and a circuit is closed from ground through the back contact of said relay, inner front contact of relay 107, winding of relay 108, winding of vertical stepping magnet 110, switch arm 113 to battery. Relay 108 operates and being slow to release remains operated during the transmission of impulses. Magnet 110 responds to each impulse and steps the brushes 119, 120 and 121 from one bank level to another. Upon the operation of relay 108 a circuit is closed from battery, winding of escape magnet 111, contacts of relay 108 to ground. Magnet 111 operates preparatory to advancing the side switch into its second position.

When the first impulse series is finished and the brushes of the switch are positioned with respect to the proper bank level of trunks, an interval follows at the end of which relay 108 releases in turn releasing escape magnet 111 which advances the side switch into its second position. As soon as arms 130 and 131 leave position 1, relay 106 releases and opens the circuit of relay 107. Relay 107, however, is slow to release and before it can become deenergized, a circuit is closed from battery through its winding, switch arm 118 in position 2, switch arm 114 in position 2, secondary off-normal contacts 115 to ground. Furthermore, a circuit is closed from battery through the winding of escape magnet 111, switch arm 114 in position 2, contacts 115 to ground. The escape magnet 111 operates preparatory to releasing the side switch into its third position.

With the side switch in position 2 a circuit is closed from battery over switch arm 113, winding and contacts of rotary stepping magnet 109 to ground. Magnet 109 operates interrupting its own circuit and steps brushes 119, 120 and 121 onto the first set of terminals in the selected bank level. The first step of magnet 109 causes contacts 115 to open. However, the test brush 121 encounters the test terminal of the first trunk in the bank level slightly in advance of the opening of contacts 115 and therefore if the first trunk is busy a ground potential exists on the test terminal thereof and the escape magnet 111 and relay 107 are maintained operated. The circuit of magnet 111 extends over side switch arm 118 in position 2 to test brush 121 while the circuit of relay 107 extends directly to test brush 121. The switch therefore continues to step in a rotary direction until test brush 121 encounters an ungrounded test terminal such as terminal 124. At this time the circuits of magnet 111 and relay 107 are opened and the escape magnet 111 releases the side switch arms to position 3 whereupon the stepping movement terminates.

As soon as the connection is extended to the selected trunk a circuit is completed from battery through the right winding of relay 125, lower left winding of repeating coil 127, terminal 123, brush 120, thence over the loop of the calling line and returning to brush 119, terminal 122, upper left winding of repeating coil 127, left winding of relay 125 to ground. Relay 125 operates and closes a circuit for relay 126. Relay 126 operates and connects ground to test terminal 124 to identify the selected trunk as busy to other switches. Immediately that the brush 121 engaged the test terminal 124 of the idle trunk, the holding circuit of relay 107 was opened, but this relay being slow to release, holds its armatures attracted until relay 125 has time to operate and in turn operates relay 126. The ground applied to test terminal 124 by relay 126 in addition to holding relay 107 operated is also extended by way of side switch arm 117 and the outer contacts of relay 107 to test conductor 132 for holding the preliminary switch.

The selector switch 105 has thus chosen an idle trunk 128, 129, leading to the manual office in which the desired line terminates. The outgoing end of this trunk is equipped with a repeater mechanism which receives impulses incoming from the subscriber's dial and repeats them over the trunk to the distant office there to position the register associable with the trunk. Relay 125 upon operating establishes a circuit from battery through the right winding of relay 207, right normal contacts of relay 208, lower left winding of repeating coil 201, conductor 129, lower right winding of coil 127, outer contacts of relay 125, upper right winding of coil 127, conductor 128, upper left winding of coil 201, left normal contacts of relay 208, left winding of relay 207 to ground. Relay 207 upon operating closes a circuit from ground over its front contact, left contact of slow-to-release relay 213, winding of slow-to-release relay 212 to battery. Relay 212 operates and completes a circuit from ground over its left contact, windings of relays 216 and 217 in parallel, contacts and windings of stepping magnet 215, resistance 214 to battery. Relays 216 and 217 are operated, but their combined resistance is such that stepping magnet 215 of the register selector switch does not receive sufficient current to operate.

It will be assumed that the brushes 241, 219, 262, 273, 261 and 239 of the selector switch are standing on the terminals of an idle register circuit. Relay 216 applies ground over its left front contact, brush 241 to the corresponding terminals in all other selector switches to identify the register circuit as busy. Relay 216, moreover, closes a circuit from ground over the left contact of relay 212, inner right contact of relay 216, brush 219, conductor 301, left back contact of relay 302, winding of relay 303 to battery. Relay 303 operates and locks over its inner left front contact, right back contact of relay 302 to ground at the back contact of relay 304 and extends its locking ground over the left back contact of relay 302, conductor 301, brush 219, inner left front contact of relay 216 through the windings of relays 216 and 217 in parallel, contacts and windings of magnet 215, resistance 214 to battery so that relays 216 and 217 are maintained operated independent of relay 212. The preceding operations have all taken place in a very brief space of time and the apparatus is thus in condition to receive the next series of impulses transmitted by the subscriber's dial. Relay 303 also establishes a circuit for relay 307 extending from ground at the outer left front contact of relay 303, back contact of relay 306, winding of relay 307 to battery. Relay 307 upon operating establishes an obvious circuit for relay 308 and a circuit extending from ground over the front contact of relay 307, right back contact of relay 309, winding of relay 310 to battery. Relay 310 operates and at its right contact establishes a circuit from ground, front contact of relay 308, through the winding of relay 309 to battery. Relay 309 at its right armature transfers the circuit of relay 310 from ground supplied by relay 307 to ground at the front contact of relay 309. Since relay 310 is slow to release, it maintains its contacts closed during the transfer.

If it be assumed for the purposes of this description that the wanted number is 2-5678W and that in response to the dialing of the first digit 2 the calling line has been extended to the terminating manual office over trunk conductors 128 and 129, now when the subscriber dials the second digit 5, relay 125 deenergizes in response to each dialed impulse and opens the circuit of relay 207. Each time that relay 207 releases in response to an impulse transmitted over the trunk 128, 129, it closes a circuit from ground over its back contact, right front contact of relay 212, outer left front contact of relay 217, brush 239, conductor 304, left back contact of relay 305, winding of relay 306 to battery. Upon each operation of relay 306 the circuit of relay 307 is opened and relay 307 releases in turn releasing relays 308 and 309. Relay 308 is fast both to operate and to release in order that it may follow relay 307 as closely as possible and relay 309 is also fast to release.

On the first release of relay 308 a circuit is closed from battery, winding of relay 311, back contact of relay 308, conductor 312 to ground at the right front contact of relay 310. Relay 311 operates and is sufficiently slow to release to remain operated throughout the impulsing for the digit in spite of the repeated momentary opening of its operating path. Relay 311 in operating opens at its right back contact the circuit of relay 313 which operated following the operation of relay 303. Relay 313 releases and remains released throughout the reception of the digit impulses.

Relays 314, 315 and 316 serve to transmit dial impulses over conductors 317 and 318 alternately to the pulse counting or recording relays 319 to 324, inclusive. At its first release relay 307 connects ground over its back contact, left contact of relay 310, right back contact of relay 316, winding of relay 314 to battery. Relay 314 operates, closing a circuit from battery through its winding, the left winding of relay 316, back contact of relay 315, contact of relay 314, front contact of relay 311, or the inner right back contact of relay 313 to grounded conductor 312. This circuit also extends to grounded conductor 312 over the outer right back contact of relay 313 and the right normal contacts of relay 325. Relay 316 does not operate being shunted by the operating circuit of relay 314. When relay 307 reoperates at the end of the first pulse, relay 316 operates, closing a circuit from grounded conductor 312, inner right back contact of relay 313, left front contact of relay 316, conductor 318, left back contact of relay 313, right back contacts of relays 322 and 320, winding of relay 319 to battery. Relay 319 operates and locks over its inner right front contact, normal contacts of relays 320, 321, 322, 323 and 325 to grounded conductor 312, thereby recording one pulse.

Relay 316 upon operating prepares a circuit from battery through the winding of relay 315, right winding and right front contact of relay 316 to the left front contact of relay 310. When relay 307 releases in response to the second pulse this circuit is completed, relay 316 being held operated and relay 315 operating, opening the holding circuit of relay 314 which now releases. At the end of the second pulse, relays 315 and 316 also release closing a circuit from grounded conductor 312, inner right contact of relay 313, left back contact of relay 316, conductor 317, right back contacts of relays 323 and 321, outer right front contact of relay 319 to the winding of relay 320 and battery. Relay 320 locks over its left alternate contacts and the normal contacts of relays 321, 322, 323 and 325 to grounded conductor 312. Relay 320 also opens the locking circuit of relay 319, which releases.

In response to the next or third dialed impulse, relay 307 releases reoperating relay 314. When relay 307 reoperates at the end of the third impulse, relay 316 operates closing a circuit as traced from ground over conductor 318, left back contact of relay 313, right back contact of relay 322, right front contact of relay 320, winding of relay 321 to battery. Relay 321 locks over its inner left front contact and the normal contacts of relays 322, 323 and 325 to grounded conductor 312, at the same time opening the locking circuit of relay 320 which releases. When relay 307 releases in response to the fourth pulse, relay 315 operates, relay 316 is held operated and relay 314 is released. At the end of the fourth pulse relays 315 and 316 also release, closing a circuit from grounded conductor 312, inner right contact of relay 313, left back contact of relay 316, conductor 317, right back contact of relay 323, outer right front contact of relay 321 to the winding of relay 322 and battery. Relay 322 locks over its inner left front contact and the normal contacts of relays 323 and 325 to grounded conductor 312, releasing relay 321.

In response to the fifth pulse, relay 307 releases reoperating relay 314. When relay 307 reoperates at the end of the fifth pulse, relay 316 operates closing a circuit as traced from ground over conductor 318, left back contact of relay 313, outer right front contact of relay 322, winding of relay 323 to battery. Relay 323 locks in a circuit from battery through its winding, back contact of relay 319, inner left front contact of relay 323, normal contacts of relay 325 to grounded conductor 312. Relay 323 also releases relay 322 so that relay 323 alone of the pulse recording relays remains operated at the end of the digit. While relay 307 remains operated between digits, relays 310, 308 and 309 remain operated and relay 311 releases.

The cycle of operations described above for relays 314, 315 and 316 repeats for every two impulses of a digit. If the number of pulses is even, the last impulse leaves these relays all normal. If the number is odd, relay 315 is left normal and relays 314 and 316 release after relays 309 and 313 have reoperated and relay 311 has released to break all ground connections which could hold them operated. This triple locking ground serves to furnish locking ground for relays 314 and 316 promptly at the start of each series of impulses and to hold it steadily until well after the end of the series.

When relay 311 closes its left contact following the dialing of the digit a circuit is closed from ground at the outer left front contact of relay 303, left back contact of relay 311, left normal contacts of relay 325, right back contact of relay 324, inner right front contact of relay 323, conductor 326, winding of select magnet 405 to battery. Magnet 405 operates rotating the middle horizontal bar of the register switch 450 clockwise and extending its operating ground over conductor 327 through the winding of relay 325 to battery. Relay 325 operates and closes a holding circuit for itself over its outer right front contact, conductor 328, normal contacts of hold magnet 412, conductor 329 to ground at the outer left contact of relay 303. At the same time it closes a circuit from ground on conductor 329, upper normal contacts of magnet 412, conductor 328, outer left front contact of relay 325, conductor 330, upper back contact of steering relay 411, winding of hold magnet 412 to battery. Magnet 412 operates and closes a locking circuit for itself from battery through its winding and the winding of steering relay 411, upper alternate contacts of magnet 412 to ground on conductor 329. The operation of relay 325 opens the operating circuit of select magnet 405, but that magnet is held operated over the locking circuit of relay 325. Relay 325 also opened the locking circuit of relay 323 restoring the pulse recording relays ready for the next digit. Magnet 412 rotates the first vertical bar of the register and since the middle horizontal bar has been rotated clockwise by the operation of select magnet 405, the rocker arm 421 is rotated to push the rod 422 upwardly in a manner and for a purpose to be hereinafter described. When the magnet 412 has fully operated, it opens at its transfer contacts the locking circuit of select magnet 405 and relay 325 thereby releasing them.

The next digit dialed by the subscriber is 6 and in the manner previously described, relays 314, 315 and 316 perform three complete cycles, the first five pulses being recorded by the successive operation of relays 319, 320, 321, 322 and 323 and the release of relays 319, 320, 321 and 322. The sixth impulse causes the grounding of conductor 317 operating relay 324 over the outer right front contact of relay 323. Relay 324 locks over its outer left contact and the right normal contacts of relay 325 to grounded conductor 312. Since relay 323 locked over the back contact of relay 319 it is also operated when relay 311 releases at the end of the digit series and a circuit is closed from ground at the outer left front contact of relay 303, back contact of relay 311, left normal contacts of relay 325, right front contact of relay 324, outer left front contact of relay 323, conductor 331, select magnet 406 to battery.

Magnet 406 operates rotating the middle horizontal bar of the register switch 450 counter-clockwise and extending its operating ground over conductor 327 through the winding of relay 325 to battery. Relay 325 operates and closes a holding circuit for itself over its outer right front contact, conductor 328, normal contacts of hold magnet 414, lower front contact of steering relay 411 to ground on conductor 329. At the same time it closes a circuit from ground on conductor 329 as traced to conductor 328, outer left front contact of relay 325, conductor 330, upper front contact of steering relay 411, upper back contact of steering relay 413, winding of hold magnet 414 to battery. Magnet 414 operates and closes a locking circuit for itself through its winding and the winding of steering relay 413, upper alternate contacts of magnet 414, lower front contact of relay 411 to ground on conductor 329. The operation of relay 325 opens the operating circuit of select magnet 406, but that magnet is held operated over the locking circuit of relay 325. Relay 325 also opens the locking circuits of relays 323 and 324 thereby restoring the pulse recording relays ready for the next digit. Magnet 414 rotates the second vertical bar of the register and since the middle horizontal bar has been rotated counter-clockwise by the operation of select magnet 406, the rocker arm 423 is rotated to pull the rod 424 downwardly for a purpose to be hereinafter described. When the magnet 414 has fully operated it opens at its transfer contacts the locking circuit of magnet 406 and relay 325 thereby releasing them.

The next digit dialed by the subscriber is 7 and in the manner previously described in response to the first six impulses, recording relays 319 to 324, inclusive, are successively operated and relays 319 to 322, inclusive, are released. The seventh impulse reoperates relay 319 over conductor 318, the left back contact of relay 313, the right back contacts of relays 322 and 320, winding of relay 319 and battery. Relay 319 releases relay 323 and locks over the normal contacts of relays 320 to 323 inclusive and normal contacts of relay 325 as before. Since relay 324 locks independently of the other recording relays, it remains operated and when relay 311 releases at the end of the digit series a circuit is closed from ground at the outer left front contact of relay 303, back contact of relay 311, left normal contacts of relay 325, right front contact of relay 324, outer left front contact of relay 319, conductor 332, winding of select magnet 407 to battery.

Magnet 407 operates rotating the next-to-lower horizontal bar of register 450 clockwise and extending its operating ground over conductor 327 through the winding of relay 325 to battery. Relay 325 operates and closes a holding circuit for itself over its outer right front contact, conductor 328, normal contacts of hold magnet 416, lower front contact of steering relay 413 to ground on conductor 329. At the same time it closes a circuit from ground on conductor 329 as traced to conductor 328, outer left front contact of relay 325, conductor 330, upper front contacts of steering relays 411 and 413, upper back contact of steering relay 415, winding of hold magnet 416 to battery. Magnet 416 operates and closes a locking circuit for itself through its winding and the winding of steering relay 415, upper alternate contacts of magnet 416, lower front contact of relay 413 to ground on conductor 329. The operation of relay 325 opens the operating circuit of select magnet 407, but that magnet is held operated over the locking circuit of relay 325. Relay 325 also opens the locking circuits of relays 319 and 324 restoring the pulse recording relays ready for the next digit. Magnet 416 rotates the third vertical bar of the register and since the next-to-lower horizontal bar has been rotated clockwise by the operation of select magnet 407, the rocker arm 425 is rotated to push rod 426 upwardly for a purpose to be hereinafter described. When magnet 416 has fully operated it opens at its transfer contacts the locking circuit of magnet 407 and relay 325, thereby releasing them.

The next digit dialed by the subscriber is 8 and in the manner previously described the recording relays are operated, relays 319 and 324 remaining operated at the end of the seventh pulse. The eighth pulse operates relay 320 over conductor 317, the right back contacts of relays 323 and 321, the outer right front contact of relay 319, winding of relay 320 to battery. Relay 320 upon operating locks and releases relay 319 as before described. With relays 320 and 324 operated when relay 311 releases at the end of the digit series, a circuit is closed from ground at the outer left front contact of relay 303, back contact of relay 311, left normal contacts of relay 325, right front contact of relay 324, outer left front contact of relay 320, conductor 333, winding of select magnet 408 to battery.

Magnet 408 operates rotating the next-to-lower horizontal bar of register 450 counter-clockwise and extending its operating ground over conductor 327 through the winding of relay 325 to battery. Relay 325 operates and closes a holding circuit for itself over its outer right front contact, conductor 328, normal contacts of hold magnet 418, lower front contact of steering relay 415 to ground on conductor 329. At the same time it closes a circuit from ground on conductor 329 as traced to conductor 328, outer left front contact of relay 325, conductor 330, upper front contacts of steering relays 411, 413 and 415, upper back contact of steering relay 417, winding of hold magnet 418 to battery. Magnet 418 operates and closes a locking circuit for itself through its winding and the winding of steering relay 417, upper alternate contacts of magnet 418, lower front contact of relay 415 to ground on conductor 329. The operation of relay 325 opens the operating circuit of select magnet 408, but that magnet is held operated over the locking circuit of relay 325. Relay 325 also opens the locking circuits of relays 320 and 324 restoring the pulse recording relays ready for the next digit. Magnet 418 rotates the fourth vertical bar of the register and since the next-to-lower horizontal bar has been rotated counter-clockwise by the operation of select magnet 408, the rocker arm 427 is rotated to pull the rod 428 downwardly for a purpose to be hereinafter described. When magnet 418 has fully operated, it opens at its transfer contacts the locking circuit of select magnet 408 and relay 325 thereby releasing them.

The last digit dialed is the station's letter W, having a numerical equivalent of the digit 9, and in the manner previously described the recording relays are operated, relays 320 and 324 remaining operated at the end of the eighth impulse. The ninth impulse operates relay 321 over conductor 318, left back contact of relay 313, right back contact of relay 322, outer right front contact of relay 320, winding of relay 321 and battery. Relay 321 upon operating locks and releases relay 320 as before described. With relays 321 and 324 operated when relay 311 releases at the end of the digit series, a circuit is closed from ground at the outer left front contact of relay 303, back contact of relay 311, left normal contacts of relay 325, right front contact of relay 324, outer left front contact of relay 321, conductor 334, winding of select magnet 409 to battery.

Magnet 409 operates rotating the lower horizontal bar of register 450 clockwise and extending its operating ground over conductor 327 through the winding of relay 325 to battery. Relay 325 operates and closes a locking circuit for itself over its outer right front contact, conductor 328, normal contacts of hold magnet 420, lower front contact of steering relay 417 to ground on conductor 329. At the same time it closes a circuit from ground on conductor 329 as traced to conductor 328, outer left front contact of relay 325, conductor 330, upper front contacts of steering relays 411, 413, 415 and 417, upper back contact of steering relay 419, winding of hold magnet 420 to battery. Magnet 420 operates and closes a locking circuit for itself through its winding and the winding of steering relay 419, upper alternate contacts of magnet 420, lower front contact of relay 417 to ground on conductor 329. The operation of relay 325 opened the operating circuit of select magnet 409, but that magnet is held operated over the locking circuit of relay 325. Relay 325 also opened the locking circuits of relays 321 and 324 restoring the pulse recording relays ready for the next digit. Magnet 420 rotates the fifth vertical bar of the register and since the lower horizontal bar has been rotated clockwise by the operation of select magnet 409, the rocker arm 429 is rotated to push the rod 430 upwardly for a purpose to be described. When magnet 420 has fully operated it opens at its transfer contacts the locking circuits of select magnet 409 and relay 325 thereby releasing them.

When steering relay 419 operates upon the registration of the last digit dialed, it closes a circuit from ground at its lower front contact over conductor 339, winding of relay 305 to battery operating relay 305 which locks over its left front contact, the left back contact of relay 302, inner left front contact of relay 303, right back contact of relay 302 to ground at the back contact of relay 304. At its outer left back contact relay 305 opens the circuit of relay 306 to prevent the reception of further impulses and at its right front contact connects battery through resistance 335, over conductor 336, brush 262, inner left front contact of relay 217, assignment lamp 263, outer right back contact of relay 264 to ground. The lamp 263 burns steadily and the operator observing it knows that a number has now been registered on her position indicator and is awaiting her attention. In response to this signal she depresses the assignment key 265 individual to the cord circuit and a circuit is closed from battery through resistance 266, inner lower contacts of relay 267, right winding of relay 264, contacts of key 265, inner right contact of relay 217 to ground. Relay 264 operates and locks through its two windings in series and its inner left contact independent of key 265. The key 265 being of the non-locking type opens its contacts as soon as released. Relay 264 in operating shifts the circuit of the assignment lamp 263 so that it now extends over interrupter 268 to ground. The lamp 263 flickers in this circuit and serves to identify to the operator the particular cord circuit at her position relating to the number displayed on her indicator through the operation of register 450.

Relay 264 also completes a circuit from ground over the inner right contact of relay 217, outer left contact of relay 264, brush 273, conductor 337, winding of relay 304 to battery. Relay 304 operates opening the locking circuits of relays 303 and 305, but these relays remain operated over conductor 301, brush 219, inner right front contact of relay 216 and the left contact of relay 212. Relay 264 also closes a circuit from battery through the winding of relay 213 and from battery through the windings of relay 269 thence over the inner right contact of relay 264 to ground at the inner right contact of relay 217. Relays 213 and 269 operate and lock to ground over the right contact of relay 269. Relay 213 opens the circuit of relay 212 which releases in turn releasing relays 303, 305, 216 and 217 and removing a busy ground from the test terminal of the register selector so that the register selector frees the register for use on another connection. Relay 303 upon releasing removes ground from conductor 329 thereby releasing all operated relays of Figs. 3 and 4 and releasing the holding magnets of the register 450 thereby restoring the register to normal.

The operator having noted the recorded line number as displayed by her indicator as will be presently described, inserts plug 278 into jack 279 of the line corresponding to the displayed number, completing a circuit from battery through lamp 280, winding of relay 267, left back contact of relay 281, sleeves of plug 278 and jack 279, winding of relay 282 to ground. Relay 267 operates completing the tip conductor of the talking circuit and a circuit from battery through the winding of relay 283, back contact of relay 284, back contact of relay 285, outer right contact of relay 213, lower front contact of relay 267, winding of relay 267 and thence to ground through the winding of relay 282. This circuit permits the energization of relay 283 and maintains relay 267 operated in shunt of lamp 280. Consequently lamp 280 remains extinguished.

With relay 283 operated a ringing circuit is completed from the source of ringing current 211, winding of relay 285, lower front contact of relay 283, rings of plug 278 in jack 279, over the called line and returning over the tips of jack 279 and plug 278, upper front contact of relay 267, upper front contact of relay 283 to ground. When the called subscriber responds, marginal relay 285 operates opening the shunt around the winding of relay 284. With this shunt removed the circuit previously traced through the windings of relays 283 and 267 and thence to ground through the winding of relay 282 now includes the winding of relay 284. This relay operates and closes a circuit from battery over its right front contact and thence over the circuit traced through the winding of relay 282 thereby shunting relay 283 which releases and closes through the talking circuit and disconnects the source of ringing current. With the talking circuit completed the called subscriber's line is included in series with the right windings of repeating coil 291 and the winding of relay 287. Relay 287 operates and closes a circuit from battery through the winding of reversing relay 288, contacts of relay 287 to ground at the left contact of relay 284. Relay 288 reverses the circuit over the trunk 128, 129 which may serve for the usual message register or coin collect operations at the originating office.

At the end of the conversation the calling subscriber replaces his receiver on the switchhook whereupon relay 125 releases opening the circuit of relay 207 which also releases. Relay 269 is shunted down by the direct application of ground at the back contact of relay 207 over the left contact of relay 269. Relay 269 therefore releases in turn releasing relay 213. Relay 213 opens the previously traced circuit through the windings of relays 284, 267 and 282. Relays 267 and 282, however, remain energized by a circuit from battery through the lamp 280, thence through the windings of relay 267 and relay 282. The shunt thus being removed, lamp 280 lights to advise the operator that the connection is no longer required. She thereupon proceeds to remove plug 278 from jack 279 thereby releasing relays 267 and 282 and extinguishing lamp 280. All apparatus at her position has now been restored to normal ready to be taken for use in connection with a subsequent call. When relay 125 released it also released relay 126 thereby initiating the release of the switches of the automatic office in the well-known manner. Inasmuch as the manner in which the register selector switch of Fig. 2 functions to preselect an idle register is not an essential part of the present invention, no detailed description thereof will be given herein, reference being made for that description to the patent to Jacobsen hereinbefore referred to.

Should the calling subscriber abandon a call before dialing digits or after incompletely dialing digits, at which time relay 303 will be operated and one or more of the steering relays 411, etc. and holding magnets 412, etc. may be operated the restoration of the calling subscriber's receiver to switchhook will release relays 125, 126 and 207 thereby releasing the selector switches of the automatic office. Relay 207 upon releasing also releases slow-to-release relay 212 and a circuit is established from ground at the back contact of relay 207, right normal contacts of relay 212, outer right front contact of relay 217, brush 261, conductor 338, right contact of relay 303, winding of relay 302 to battery. Relay 302 operates, opens the locking circuit of relay 303 which releases and removes ground from conductor 301 to render the register available for subsequent use. Relay 303 upon releasing removes ground from conductor 329 thereby releasing all operated apparatus of the register.

Having discussed the manner in which the register switch 450 is controlled to record the digits of a line number, the mechanism of the register and number indicator will now be described. The cross-bar register disclosed in Figs. 5 and 6 is of substantially the same type as disclosed in the patent to Reynolds hereinbefore referred to with the exception that the cross-point contacts have been omitted and the rocker arm mechanism shown in detail in Figs. 8, 9 and 10 has been substituted therefor.

Essentially the register comprises top and bottom channel frame members 431 and 432 and vertical side frame members 433 and 434 welded to the top and bottom frame members. Between the top and bottom frame members are mounted five vertical assembly units 435. Each of these units comprises a vertical plate 436 secured to the upper and lower frame members by the lugs 437 and screws 438 and a vertical member 439 secured in any desired manner to the upper horizontal bracket 440 which is in turn secured to the upper frame member 431 by lugs 441 and screws 442 and to the lower horizontal bracket 443 which is in turn secured to the lower frame member 432 by lugs 444 and screws 445. Pivoted on the vertical plate 436 is a vertical bar 446 rotatable by a hold magnet such as 412. Secured to the upper end of the plate 436 is a set of off-normal springs 447 operated by a projection on the vertical bar 446 when the bar is rotated by the magnet 412. These off-normal springs are shown, for example, in Fig. 4 as the contacts associated with the windings of the hold magnets 412, 414, etc. A normalling spring 457 is associated with each vertical bar 446.

The vertical bar 446 is provided with five inwardly extending projections 448 which are all connected with a vertical member 449. This member is secured at right angles to the projections 448 and is provided with notches 451 as disclosed more clearly in Figs. 8 and 9 for a purpose to be presently described. The horizontal bars 452 of which there are five, are mounted in front of the vertical bars on brackets 453 secured to the vertical side plate members 433 and 434. Bearing screws 454 secured in the brackets 453 serve as pivots for the horizontal bars. The upper, middle and lower horizontal bars have armatures secured to the left ends thereof and the two remaining bars have armatures secured to the right ends thereof.

Each armature extends both upwardly and downwardly from the horizontal bar and cooperates with two select magnets. The select magnets are mounted in pairs on the side members 433 and 434, magnets 401, 402, 405, 406, 409 and 410 being mounted on the left side member 433 and magnets 403, 404, 407 and 408 being mounted on the right side member 434. By the provision of two magnets for each horizontal bar it is possible to rotate the horizontal bar in either a clockwise or counter-clockwise direction as will be evident by referring to Fig. 8. Positioned on the side members 433 and 434 adjacent to each armature are two pairs of off-normal springs 455, one pair of springs being closed by a projection carried by the armature when the armature is attracted by one of the associated pair of magnets and the other pair of springs being closed when the armature is attracted by the other magnet of the pair. These pairs of springs are shown schematically as directly associated with the corresponding select magnets 401 to 410, inclusive, in Fig. 4. For normally holding each horizontal bar in a neutral position, springs (not shown) are provided. These springs and the detailed construction of the off-normal springs are clearly disclosed in the patent to Reynolds hereinbefore referred to.

Each horizontal bar 452 is provided with five spring fingers 456 which extend inwardly and lie in the notches 451 of the five vertical members 449 which are attached to the vertical bars 446 there being therefore a spring finger at each intersection point of the horizontal and vertical bars. The association of one of these spring fingers with a notch member 449 is clearly disclosed in Figs. 8, 9 and 10.

Positioned at the intersection point of each vertical and each horizontal bar is a rocker arm. These rocker arms are pivoted to ears 458 struck up from the vertical members 439. Referring to Figs. 8, 9 and 10 it will be noted that each rocker arm, for example arm 421, is of substantially U-shape and that the pivot pin 459 extends through the two parallel legs of the rocker arm and through the two ears 458 of the member 439. The base of the rocker arm is provided with two upwardly extending portions 460 which are positioned on either side of the member 449 as viewed in Fig. 10 and opposite the upper end of the notch 451, and two downwardly extending portions 461 which are positioned similarly on either side of the member 449 and opposite the lower end of the notch 451. For holding the rocker arm 421 in a neutral position two springs 462 attached to the lug 463 of member 439 are provided. Attached to the longer leg of each rocker arm is a rod such as 422 extending to an indicator unit. There are therefore five of these rods extending from the five rocker arms pivoted on each of the vertical members 439 extending to the same indicator unit as clearly disclosed in Figs. 4 and 6.

The indicator having as many indicator units as there are vertical bars or vertical rows of rocker arms comprises a base member 464, attached by screws to the upper frame member 431 of the register, having upwardly extending lugs 465 which support the two shafts 466 and 467. Each indicator unit comprises an indicator drum 468 to which is secured a pinion 469, a segmental gear 470 and a U-shaped spring 471 secured by its base to the vertically extending projection 472 of the base member 464. The two arms of the spring 471 engage the two edges of the segmental gear 470 and thereby normally hold it in the neutral position shown in Fig. 6. The five operating rods such as 422 associated with each unit are provided at their upper ends with right angle extensions which engage in slots in the segmental gear 470.

The indicator drums 468 and attached pinions 469 are all freely mounted on the shaft 466 and suitably spaced thereon by spacing sleeves 473 and the segmental gears 470 are similarly mounted on shaft 467 and suitably spaced thereon by spacing sleeves 474. For enclosing all of the indicator units a cover 475 is provided which may be secured to the upper frame member 431 of the register by screws. The top of the cover 475 is provided with sight openings 476 through which the indicator drums 468 project to enable the exposed portions of these drums to be viewed. These sight openings may, if desired, be covered by a transparent member 477 suitably secured in a frame 478 attached to the cover 475.

The indicator drums of the first four units as shown in Fig. 5, have on their peripheries the numerals 1 to 0, inclusive, the odd numerals appearing on one-half of the periphery and the even numerals on the other half. The fifth indicator drum of the fifth unit which is employed to indicate the station's letter of a desired line number, has the letters J, M, R, and W on its periphery in positions thereon corresponding to the numerals 5, 6, 7 and 9 appearing on the other drums.

Having described the mechanism of the register switch and indicator, the numeral in which this mechanism operates will now be described. It will be recalled that in the preceding discussion of the operation of the circuit it was assumed that in response to dialing the second or thousands digit 5 the select magnet 405 was operated. Referring now to Fig. 8 it will be noted that the operation of magnet 405 rotates the middle horizontal bar 452 in a clockwise direction thereby moving the spring finger 456 to the bottom of notch 451 in vertical member 449. When thereafter the hold magnet 412 was operated as previously described, the vertical bar was rotated thus moving the vertical member 449 and forcing the end of the spring finger against the downwardly extending members 461 of arm 421. This causes the end of arm 421 to move upwardly pushing up on rod 422. When the end of rod 422 engages the upper end of the slot 479 in segmental gear 470 the gear is rotated upwardly to an extent determined by the position of the slot 479 with respect to the axis of the gear thereby rotating the pinion 469 and indicator drum 468 in a counter-clockwise direction to expose the numeral 5 beneath the sight opening 476 of the cover. The first indicator unit is thus set to display the thousands digit 5.

When the select magnet 405 is subsequently released the middle horizontal bar 452 rotates to its neutral position returning all of its spring fingers to their intermediate positions in the notches 451 of members 449, with the exception of the spring finger which is engaged in the notch of member 449 of the first vertical register unit 435. This finger is held in its off-normal position by the continued energization of the hold magnet 412 maintaining the rocker arm 421, rod 422 and operated indicator unit in the positions to which they were operated.

It will be recalled that in response to the dialing of the hundreds digit 6 select magnet 406 was next operated followed by the operation and locking of the hold magnet 414. Upon the operation of magnet 406 the middle horizontal bar 452 was again rotated, but in a counter-clockwise direction thus moving its four free spring fingers to the tops of the notches 451 in the associated vertical members 449. Now when the hold magnet 414 is operated to rotate the vertical bar 446 of the second vertical unit, the vertical member 449 attached to the vertical bar forces the end of the spring finger engaged in the upper end of the notch 451 thereof against the upwardly extending members 460 of rocker arm 423. Since the construction of all rocker arms is the same, this action may be better visualized by referring to Figs. 8 and 9. The rocker arm 423 is thus rotated to pull down on the rod 424. Since the second indicator unit is identical in construction to the first indicator unit and the rod 424 engages in a similar slot 479 in the segmental gear 470 thereof, the rod 424 will cause the segmental gear to move downwardly when the rod engages the bottom of the slot thereby rotating the indicator drum 468 of the second unit in a clockwise direction to such an extent as to expose the numeral 6 beneath the second sight opening 476. The second indicator unit is thus set to display the hundreds digit 6.

When the select magnet 406 is subsequently released, the middle horizontal bar 452 rotates to its neutral position. The spring fingers which are engaged in the notches of members 449 of the first two vertical units will remain in their operated positions due to the continued energization of hold magnets 412 and 414 and the remaining spring fingers will be restored to their normal position. The rocker arm 423, rod 424 and second indicator unit will therefore be held in the positions to which they were operated.

In response to the dialing of the tens digit 7, select magnet 407 was next operated followed by the operation and locking of hold magnet 416. Upon the operation of magnet 407 the next-to-lower horizontal bar 452 was rotated in a clockwise direction resulting in a rotation of the rocker arm 425 in a direction to push up on rod 426 when the hold magnet 416 is energized. Since the third indicator unit is identical in construction to the first indicator unit and the rod 426 engages in a slot similar to slot 480 in the segmental gear 470 thereof, when the rod engages the upper end of the slot the gear is rotated upwardly to an extent determined by the position of the slot 480 with respect to the axis of the gear thereby rotating the pinion 469 and indicator drum 468 of the third unit in a counter-clockwise direction to such an extent as to expose the numeral 7 beneath the third sight opening 476. The third indicator unit is thus set to display the tens digit 7. When the select magnet 407 is subsequently released the operated horizontal bar is restored to its neutral position and the rocker arm 425, rod 426 and third indicator unit are maintained in their operated positions so long as the hold magnet 416 is maintained operated.

In response to the dialing of the units digit 8, select magnet 408 was next operated followed by the operation and locking of hold magnet 418. Upon the operation of magnet 408 the next-to-bottom horizontal bar 452 was again rotated but in a counter-clockwise direction resulting in a rotation of rocker arm 427 in a direction to pull down on rod 428 when the hold magnet 418 is energized. Since the fourth indicator unit is identical in construction to the first indicator unit and the rod 428 engages in a slot similar to slot 480 in the segmental gear 470 thereof, when the rod engages the lower end of the slot the indicator drum of the fourth unit is rotated in a clockwise direction to such an extent as to expose the numeral 8 beneath the fourth sight opening 476. The fourth indicator unit is thus set to display the units digit 8. When the select magnet 408 is subsequently released, the operated horizontal bar is restored to its neutral position and the rocker arm 427, rod 428 and fourth indicator unit are maintained in their operated positions so long as the hold magnet 418 is maintained operated.

In response to the dialing of the station letter W, which has the numerical equivalent of the digit 9, select magnet 409 was operated followed by the operation and locking of hold magnet 420. Upon the operation of magnet 409 the bottom horizontal bar 452 was rotated in a clockwise direction resulting in a rotation of rocker arm 429 in a direction to push up on rod 430 when the hold magnet 420 is energized. The fifth indicator unit is identical in construction to the first indicator unit with the exception that the indicator drum 468 thereof has the station letters J, M, R, W thereon instead of numerals. The rod 430 engages in a hole in the segmental gear 470 at a position adjoining the axis of the gear, as indicated at 481 in Fig. 5. Therefore, the movement of rod 430 upwardly rotates the segmental gear upwardly to an extent determined by the location of the hole 481 with respect to the axis of the gear resulting in the rotation of the drum 468 of the fifth unit in a counter-clockwise direction to expose the letter W beneath the fifth sight opening 476. The fifth indicator is thus set to display the station letter W. When the select magnet 409 is subsequently released the operated horizontal bar is restored to its neutral position and the rocker arm 429, rod 430 and fifth indicator unit are maintained in their operated positions so long as the hold magnet 420 is maintained operated.

The entire line designation 5678W has now been displayed. The operator proceeds to complete the connection to the line whose number is thus displayed and the register circuit is restored in the manner previously described. When the operated hold magnets are thereby released the spring fingers 456 of any horizontal bars 452 which were retained in an off-normal position are released. The operated rocker arms such as 421 are restored to their neutral position by the springs 462 and the segmental gears 470 of the indicator units are returned to their normal positions by the springs 471 thereby restoring the indicator drums to normal.

Before leaving the description of the operation of the indicator units it may be well to note that the slots such as 479 and 480 in the segmental gear 470 are provided to reduce as far as possible the rotation of other rocker arms in the same vertical row when one rocker arm of a row is rotated through the conjoint operation of a horizontal bar and a vertical bar. Some interaction between the rocker arms will result since they are linked by the rods such as 422 with the same segmental gear. The rotation of other rocker arms in the same vertical row through this interlinking is, however, without effect due to the conformation of the extensions 460 and 461 of the rocker arm since at that time the spring fingers 456 of other horizontal bars will be in their neutral positions and even though moved to the left as viewed in Fig. 9 by the operated vertical member 449, will not interfere with the free rotation of the adjacent rocker arms.

Figure 11:
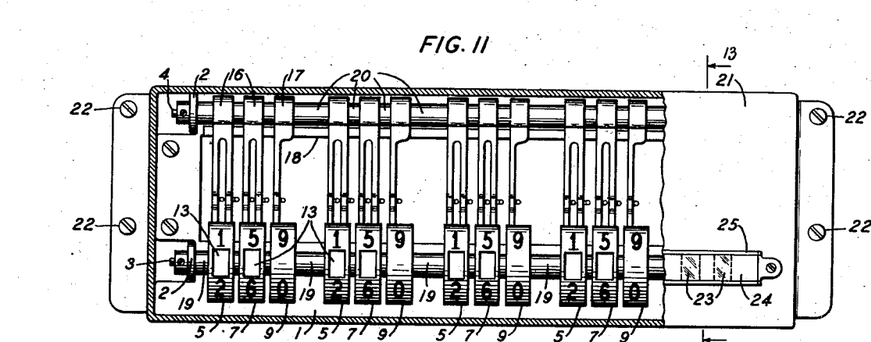
Fig. 11 showing a top plan view with the cover plate broken away to disclose the indicator units.
Figures 12, 13, 14, 15:
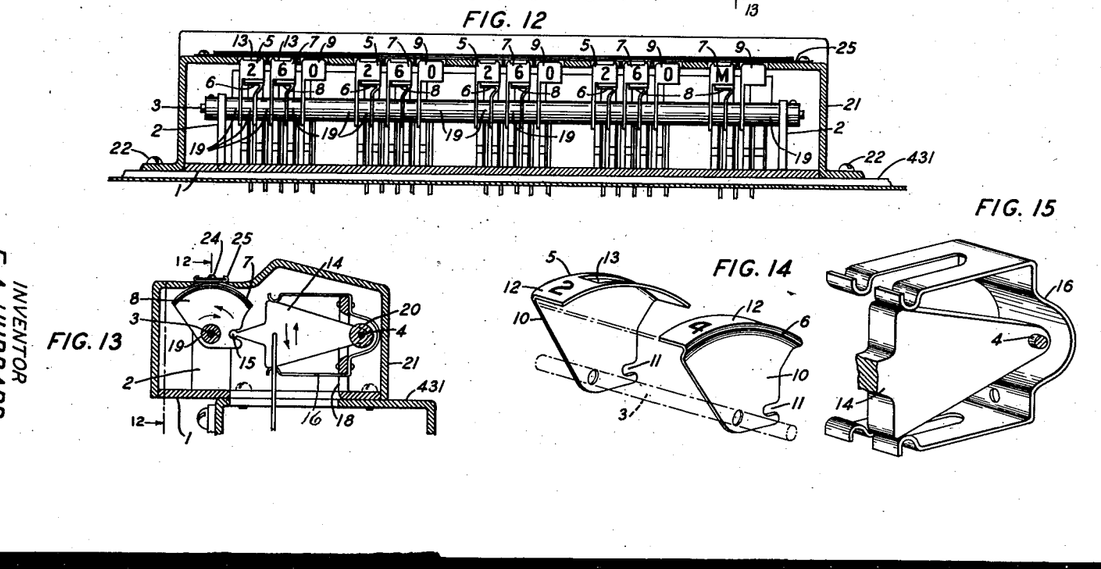

The modified form of indicator disclosed in Figs. 11 to 15, inclusive, may be used with the cross-bar register in lieu of the indicator disclosed in Figs. 5, 6 and 7. This indicator has as many indicator units as there are vertical bars or vertical rows of rocker arms and comprises a base member 1, attached by screws to the upper frame member 431 of the register, having upwardly extending lugs 2 which support the two shafts 3 and 4. Each indicator unit, except the station indicator, comprises five targets 5, 6, 7, 8 and 9, the targets 5 and 6 not being required for the station indicator, an operating lever 14 for each target and U-shaped springs 16 and 17, secured to the upwardly extending projection 18 of the base member 1. The two arms of each spring 16 are bifurcated as shown in Figs. 11 and 15 and engage the upper and lower edges of two of the operating levers 14 and the two arms of spring 17 engage the upper and lower edges of a single lever 14. These springs serve to normally hold the levers in their neutral positions.

Each target has a segmental web 10 having a circular recess 11 therein which is engaged by the extension 15 of the associated operating lever 14, and a cylindrical periphery 12 as disclosed more clearly in Fig. 14. The targets 5 and 6, and 7 and 8 are nested one within the other in pairs, the peripheral surface 12 of the outer target of each pair being provided with an opening 13 through which numerals or letters painted or otherwise placed on the peripheral surfaces of the associated inside targets may be exposed.

All the targets of all indicator units are rotatably mounted on shaft 3 and suitably spaced thereon by spacing sleeves 19 and all of the levers are similarly mounted on shaft 4 and suitably spaced thereon by spacing sleeves 20. For enclosing all of the units a cover 21 is provided which may be secured to the upper frame member 431 of the register by screws 22. The top of the cover 21 is provided with sight openings 23 through which the targets project to enable the exposed portions of their peripheries to be viewed. These sight openings may be, if desired, covered by a transparent member 24 suitably secured in a frame 25 attached to the cover 21.

In each of the first four units the target 5 has on its periphery the numerals 1 and 2 and the target 6 has numerals 3 and 4. Each target 7 bears the numerals 5 and 6, each target 8 bears the numerals 7 and 8 and each target 9 bears the numerals 9 and 0. In the station indicator unit the target 7 bears the letters J and M, target 8 bears the letter R and target 9 bears the letter W in positions thereon corresponding to the positions of numerals 5, 6, 7 and 9 on the corresponding targets in the other units.

The operating rods extending from the rocker arms of each vertical row of the register are pivotally connected at their upper ends to the operating levers 14 of the corresponding indicator units as disclosed in Fig. 13 whereby if any rod is pushed up or pulled down by the rocker arm with which it is connected it will either push up or pull down on the lever 14 with which it is pivotally connected resulting in a partial rotation of the target with which the lever cooperates. Thus, if the lever 14 is pushed up the target will be given a counterclockwise rotation, whereas if the lever is pulled down the target will be given a clockwise rotation.

The manner in which the indicator functions will be apparent from the following description of the operation of the first unit thereof in response to the registration of any thousands digit.

If the digit 1 is registered, the successive operation of select magnet 401 and hold magnet 412 will cause the upper rocker arm in the row associated with the first vertical bar to push up on the rod connected thereto which through the lever 14 connected to the upper end of this rod will rotate the target 5 counter-clockwise to display the numeral 1 in a sight opening 23. If the digit 2 is registered, magnets 402 and 412 are operated causing the upper rocker arm to pull down on this rod thus rotating target 5 clockwise to display the numeral 2. If the digit 3 is registered, magnets 403 and 412 are operated causing the next-to-upper rocker arm in the first vertical row to push up on the rod connected thereto which will rotate the target 6 counter-clockwise to display the numeral 3 through the opening 13 in target 5 and sight opening 23. Should the digit 4 be registered, magnets 404 and 412 are operated causing the next-to-upper rocker arm to pull down on the rod connected thereto thereby rotating target 6 clockwise to display the numeral 4 through the opening 13 in target 5 and sight opening 23.

Targets 7, 8 and 9 are operated in a similar manner by the other rocker arms in the first vertical row to display the numerals 5 to 0, inclusive, in response to the operation of select magnets 405, 406, 407, 408, 409 and 410 in conjunction with hold magnet 412.

It will be apparent that the targets could be made of transparent material with opaque numerals or letters thereon and be illuminated by lamps enclosed within the casing 21. Furthermore, while the register and indicator equipments have been disclosed and described in connection with a telephone system for displaying the designations of telephone lines, these equipments are equally applicable to any annunciator system as, for example, a carriage call system by which any number may be registered and displayed under the control of a remote control station. Also, banks of number display lamps such as are disclosed in the patent to Jacobsen could be employed in lieu of the indicator units and selectively lighted by the closure of contact sets positioned at the intersections of the horizontal and vertical bars of the register switch as disclosed in the patent to Reynolds.

What is claimed is:

1. In a registering and indicating mechanism comprising a plurality of selecting bars, select magnets for selectively operating said bars, a plurality of holding bars positioned at right angles to said selecting bars and hold magnets for operating said holding bars, one of said holding bars being operated in response to the operation of one of said selecting bars, a device allocated to each holding bar for displaying characters corresponding to digital values, a rocker arm positioned at the intersection of each selecting bar and each holding bar, there being a row of rocker arms associated with each holding bar, operating rods connecting the rocker arms of a row to the display device allocated to the particular holding bar and means operable by the conjoint operation of any one of said selecting bars and a holding bar for selectively operating said rocker arms whereby the display device allocated to said holding bar is selectively operated to display a character.

2. In a registering and indicating mechanism comprising a plurality of selecting bars, select magnets for selectively and repeatedly operating said bars, a plurality of holding bars positioned at right angles to said selecting bars and hold magnets for operating said holding bars, said holding bars being operated in succession in response to the successive operation of said selecting bars, a device allocated to each holding bar for displaying characters corresponding to digital values, a rocker arm positioned at the intersection of each selecting bar and each holding bar, there being a row of rocker arms associated with each holding bar, operating rods connecting the rocker arms of a row to the display device allocated to the particular holding bar and means operable by the conjoint operation of said selecting bars and said holding bars for selectively operating a rocker arm in each row whereby the display devices allocated to said holding bars are selectively operated to display characters.

3. In a registering and indicating mechanism comprising a cross-bar mechanism having a plurality of selecting bars, a plurality of holding bars positioned at right angles to said selecting bars, means for selectively operating one of said selecting bars and means responsive thereto for operating one of said holding bars, a rocker arm at the intersection of each selecting bar and each holding bar, there being a row of rocker arms associated with each holding bar, a display device allocated to each row of rocker arms, each display device comprising a character bearing drum, an operating member for rotating said drum and operating rods connecting different radial points on said operating member to the rocker arms of the row to which the display device is allocated, and means operable through the conjoint operation of any one of said selecting bars and said holding bar whereby said rocker arms are selectively operated to cause the selective rotation of said drum.

4. In a registering and indicating mechanism comprising a cross-bar mechanism having a plurality of selecting bars operable in either of two directions, a plurality of holding bars positioned at right angles to said selecting bars, means for selectively operating said selecting bars in either direction of movement and means responsive thereto for operating one of said holding bars, a rocker arm at the intersection of each selecting bar and each holding bar, there being a row of rocker arms associated with each holding bar, said rocker arms being operable in either of two directions in accordance with the direction of movement of the associated selecting bars, a display device allocated to each row of rocker arms, each display device comprising a character bearing drum, a pinion attached thereto, a segmental gear meshing with said pinion and operating rods connecting different radial points on said gear with the rocker arms of the row to which the display device is allocated, and means operable through the conjoint operation of any one of said selecting bars and said holding bar whereby said rocker arms are selectively operated to cause the selective rotation of said drum by said segmental gear.

5. In a registering and indicating mechanism comprising a cross-bar mechanism having a plurality of selecting bars rotatable in either a clockwise or counter-clockwise direction, a plurality of holding bars positioned at right angles to said selecting bars, means for selectively rotating said selecting bars in either direction, and means responsive thereto for operating one of said holding bars, a rocker arm at the intersection of each selecting bar rotatable in either a clockwise or a counterclockwise direction and each holding bar, there being a row of rocker arms associated with each holding bar, means operable through the conjoint operation of one of said selecting bars and a holding bar dependent upon the direction of rotation of the operated selecting bar for selectively rotating the rocker arms of each row in either a clockwise or counter-clockwise direction, a display device allocated to each row of rocker arms, each display device comprising a character bearing drum, a pinion attached thereto, a segmental gear meshing with said pinion and operating rods connecting different radial points on said gear with the rocker arms of the row to which the display device is allocated whereby the selective rotation of said rocker arms causes the rotation of said drum in either a clockwise or counter-clockwise direction to display different characters.

6. In a registering and indicating mechanism comprising a cross-bar mechanism having a plurality of selecting bars, a pair of select magnets associated with each bar for rotating said bar in either a clockwise or counter-clockwise direction, a plurality of holding bars positioned at right angles to said selecting bars and a hold magnet for operating each of said holding bars, a rocker arm positioned at the intersection of each selecting bar and each holding bar, there being a row of rocker arms associated with each holding bar, means operative upon the conjoint operation of a selecting bar and a holding bar to impart either a clockwise or counter-clockwise movement to the rocker arm at their point of intersection dependent upon the rotational direction of said selecting bar, a movable indicating device allocated to each row of rocker arms and means interposed between said rocker arms and said device for variably positioning said device in accordance with the selective operation of said select magnets.

7. In a registering mechanism, a plurality of rows of selectively operable members, means for selectively operating said members in either of two directions and an indicating mechanism having a character displaying unit allocated to each row of operating members, each of said units comprising a display drum bearing odd numbered characters on one-half of its periphery and even numbered characters on the other half of its periphery, means for rotating said drum and means associated with said rotating means and with each operating member of the row to which said unit is allocated for rotating said drum to a different extent in either a clockwise or a counterclockwise direction dependent on the direction of movement of the operated member to bring any one of said characters into a display position.

8. In a registering mechanism, a plurality of rows of selectively operable members, means for selectively operating said members in either of two directions and an indicating mechanism having a character displaying unit allocated to each row of operating members, each of said units comprising a display drum bearing odd numbered characters on one-half of its periphery and even numbered characters on the other half of its periphery, a pinion attached to said drum, a segmental gear meshing with said pinion, and rods connecting said gear with each of the operating members of the row to which said unit is allocated, said rods being connected to said gear at progressively increasing distances from its axis whereby the selective operation of said operating members will impart different rotational movements to said drum to bring any one of said characters into a display position.

9. In a registering mechanism, a plurality of rows of operable members, means for selectively operating any one of said members in either of two directions and an indicating mechanism having a character displaying unit allocated to each row of operating members, each of said units comprising a plurality of targets each having two display characters thereon, an operating lever for each target for moving said target in either of two directions and a rod connecting each of said levers respectively with the operating members of the row to which the unit is allocated whereby the selective operation of any operating member moves one of said targets to bring one of the characters thereon into a display position.

10. In a registering mechanism comprising a cross-bar mechanism having a plurality of selecting bars rotatable in either a clockwise or counterclockwise direction, a plurality of holding bars positioned at right angles to said selecting bars and a means at the intersection of each selecting bar and each holding bar operable by the conjoint operation of said bars, a rocker arm associated with each of said means, there being a row of rocker arms associated with each holding bar, the rocker arms of each row being selectively rotatable in either a clockwise or counterclockwise direction by said means through the conjoint operation of one of said selecting bars and a holding bar dependent upon the direction of rotation of the operated selecting bar and an indicating mechanism having a character displaying unit allocated to each row of rocker arms, each of said units comprising a plurality of targets each having two display characters thereon, an operating lever for each target for moving said target in either of two directions and a rod connecting each of said levers respectively with the rocker arms of the row to which the unit is allocated whereby the selective rotation of said rocker arms moves one of said targets to bring one of the characters thereon into a display position.

FRANCIS A. HUBBARD.